(12) United States Patent
Kim et al.

(10) Patent No.: US 10,419,765 B2
(45) Date of Patent: *Sep. 17, 2019

(54) METHOD AND APPARATUS FOR CODING/DECODING IMAGE

(71) Applicants: Hui Yong Kim, Daejeon (KR); Sung Chang Lim, Daejeon (KR); Jin Ho Lee, Daejeon (KR); Jin Soo Choi, Daejeon (KR); Jin Woong Kim, Daejeon (KR); Gwang Hoon Park, Seongnam-si (KR); Kyung Yong Kim, Suwon-si (KR)

(72) Inventors: Hui Yong Kim, Daejeon (KR); Sung Chang Lim, Daejeon (KR); Jin Ho Lee, Daejeon (KR); Jin Soo Choi, Daejeon (KR); Jin Woong Kim, Daejeon (KR); Gwang Hoon Park, Seongnam-si (KR); Kyung Yong Kim, Suwon-si (KR)

(73) Assignees: ELECTRONICS AND TELECOMMUNICATIONS RESEARCH INSTITUTE, Daejeon (KR); UNIVERSITY—INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/023,983

(22) Filed: Jun. 29, 2018

(65) Prior Publication Data
US 2018/0310005 A1    Oct. 25, 2018

Related U.S. Application Data

(63) Continuation of application No. 15/802,824, filed on Nov. 3, 2017, now Pat. No. 10,045,031, which is a
(Continued)

(30) Foreign Application Priority Data

Jul. 2, 2012 (KR) .......................... 10-2012-0071938
Jul. 2, 2013 (KR) .......................... 10-2013-0077047

(51) Int. Cl.
*H04N 19/167* (2014.01)
*H04N 19/126* (2014.01)
(Continued)

(52) U.S. Cl.
CPC ......... *H04N 19/167* (2014.11); *H04N 19/126* (2014.11); *H04N 19/18* (2014.11); *H04N 19/46* (2014.11)

(58) Field of Classification Search
CPC ..... H04N 19/167; H04N 19/126; H04N 19/18
(Continued)

(56) References Cited

U.S. PATENT DOCUMENTS

2002/0163964 A1  11/2002  Nichols
2005/0063471 A1   3/2005  Regunathan et al.
(Continued)

FOREIGN PATENT DOCUMENTS

CN  102256126 A  7/2011
JP  2005-184042 A  7/2005
(Continued)

OTHER PUBLICATIONS

Benjamin Bross et al., "High efficiency video coding (HEVC) test specification draft 7".
(Continued)

*Primary Examiner* — William C Vaughn, Jr.
*Assistant Examiner* — Naod W Belai
(74) *Attorney, Agent, or Firm* — Sughrue Mion, PLLC

(57) ABSTRACT

Disclosed are a method and an apparatus for coding/decoding an image. The method for decoding the image comprises
(Continued)

the steps of: deriving a scale factor of a current block, depending on whether the current block is a conversion skip block; and scaling the current block on the basis of the scale factor, wherein the scale factor of the current block is derived on the basis of the position of a conversion coefficient inside the current block, and wherein the conversion skip block is the current block to which conversion is not applied and is specified on the basis of information indicating whether to apply reconversion to the current block.

15 Claims, 7 Drawing Sheets

Related U.S. Application Data continuation of application No. 14/412,316, filed as application No. PCT/KR2013/005864 on Jul. 2, 2013, now Pat. No. 9,843,809.

(51) Int. Cl.
*H04N 19/18* (2014.01)
*H04N 19/46* (2014.01)

(58) Field of Classification Search
USPC .................... 375/240.02, 240.03, 240.18
See application file for complete search history.

(56) References Cited

U.S. PATENT DOCUMENTS

| | | |
|---|---|---|
| 2006/0291556 A1 | 12/2006 | Watanabe et al. |
| 2007/0223579 A1 | 9/2007 | Bao |
| 2009/0175338 A1 | 7/2009 | Segall |
| 2009/0232217 A1 | 9/2009 | Lee et al. |
| 2013/0016788 A1 | 1/2013 | Oh |
| 2013/0051457 A1 | 2/2013 | Joshi et al. |
| 2013/0177077 A1* | 7/2013 | Yeo .................. H04N 19/00781 375/240.12 |
| 2013/0294524 A1* | 11/2013 | Van Der Auwera ........................ H04N 19/176 375/240.18 |
| 2013/0343448 A1* | 12/2013 | He ....................... H04N 19/176 375/240.03 |

FOREIGN PATENT DOCUMENTS

| | | |
|---|---|---|
| KR | 10-2009-0099234 A | 9/2009 |
| KR | 10-2012-0033218 A | 4/2012 |
| KR | 10-2012-0066593 A | 6/2012 |
| WO | 2013/187060 A1 | 12/2013 |
| WO | 2014/002897 A1 | 1/2014 |

OTHER PUBLICATIONS

Cuiling Lan et al., "Intra transform skipping" Joint Collaborative Team on Video Coding (JCT-VC) of ITU-T SG 16 WP 3 and ISO/IEC JTC 1/SC 29/WG 11 9th Meeting; Geneva, CH, Apr. 27-May 7, 2012, pp. 1-11.

International Search Report for PCT/KR2013/005864 dated Oct. 17, 2013.

* cited by examiner

METHOD AND APPARATUS FOR CODING/DECODING IMAGE

CROSS REFERENCE TO RELATED APPLICATIONS

This is a continuation of U.S. application Ser. No. 15/802,824 filed Nov. 3, 2017, which is a continuation of U.S. application Ser. No. 14/412,316 filed Dec. 31, 2014, which issued as U.S. Pat. No. 9,843,809, which is a national stage entry of International Patent Application No. PCT/KR2013/005864 filed Jul. 2, 2013, which claims priority from Korean Patent Application No. 10-2012-0071938 filed Jul. 2, 2012 and Korean Patent Application No. 10-2013-0077047 filed Jul. 2, 2013, in the Korean Intellectual Property Office, the disclosures of which are incorporated by reference in their entireties.

TECHNICAL FIELD

The present invention relates to the encoding/decoding of an image and, more particularly, to a method and apparatus for scaling a transform coefficient.

BACKGROUND ART

Broadcast service having High Definition (HD) resolution (1280×1024 or 1920×1080) is extended nationwide and globally. Accordingly, many users are accustomed to video having high resolution and high picture quality. Accordingly, a lot of institutes are giving impetus to the development of the next-generation image device. Furthermore, as there is a growing interest in Ultra High Definition (UHD) having resolution 4 times higher than HDTV along with HDTV, moving image standardization organizations have become recognized a need for compression technology for an image having higher resolution and higher picture quality. Furthermore, there is an urgent need for a new standard which can maintain the same picture quality and also have many advantages in terms of a frequency band or storage through higher compression efficiency than that of H.264/AVC that is now used in HDTV, mobile phones, and Blue ray players.

Today, Moving Picture Experts Group (MPEG) and Video Coding Experts Group (VCEG) are jointly standardizing High Efficiency Video Coding (HEVC), that is, the next-generation video codec, and are aiming to encode an image including a UHD image with compression efficiency twice than that of H.264/AVC. This can provide an image having a lower frequency than and higher picture quality than a current image even in 3D broadcasting and a mobile communication network as well as HD and UHD images.

DISCLOSURE

Technical Problem

The present invention provides a method and apparatus for encoding and decoding an image, which can improve encoding/decoding efficiency.

The present invention provides a method and apparatus for scaling transform coefficients (or residual signal), which can improve encoding/decoding efficiency.

The present invention provides a method and apparatus for quantization/dequantization a transform skip block, which can improve encoding/decoding efficiency.

Technical Solution

In accordance with an aspect of the present invention, there is provided an image decoding method. The image decoding method includes deriving a scale factor for a current block depending on whether or not the current block is a transform skip block and performing scaling on the current block based on the scale factor.

The scale factor for the current block is derived based on a location of a transform coefficient within the current block, and the transform skip block is a block in which transform has not been applied to the current block and is specified based on information indicative of whether or not to apply inverse transform to the current block.

In deriving the scale factor for the current block, a basic scale factor may be derived irrespective of the location of the transform coefficient within the current block if the current block is the transform skip block.

The basic scale factor may have a specific scale factor value, and the specific scale factor value may be 16.

The basic scale factor may have a different scale factor value depending on whether or not the current block uses a quantization matrix.

The basic scale factor may have a different scale factor value depending on whether the current block is a luma block or a chroma block.

A flag indicating whether or not a transform skip algorithm is used in a picture including the current block is signaled through a Picture Parameter Set (PPS). The basic scale factor may include information about a scale factor for a luma signal and a chroma signal.

In deriving the scale factor for the current block, a basic scale factor may be derived irrespective of the location of the transform coefficient within the current block if the current block is the transform skip block or the current block does not use a quantization matrix.

In deriving the scale factor for the current block, the scale factor for the current block may be derived using a quantization matrix based on the location of the transform coefficient within the current block if the current block is not a transform skip block.

In accordance with another aspect of the present invention, there is provided an image decoding apparatus. The image decoding apparatus includes a dequantization unit for deriving a scale factor for a current block depending on whether or not the current block is a transform skip block and performing scaling on the current block based on the scale factor.

The scale factor for the current block may be derived based on a location of a transform coefficient within the current block, and the transform skip block may be a block in which transform has not been applied to the current block and is specified based on information indicative of whether or not to apply inverse transform to the current block.

In accordance with yet another aspect of the present invention, there is provided an image encoding method. The image encoding method includes deriving a scale factor for a current block depending on whether or not the current block is a transform skip block and performing scaling on the current block based on the scale factor.

The scale factor for the current block may be derived based on a location of a transform coefficient within the current block, and the transform skip block may be a block in which transform has not been applied to the current block and is specified based on information indicative of whether or not to apply inverse transform to the current block.

In deriving the scale factor for the current block, a basic scale factor may be derived irrespective of the location of the transform coefficient within the current block if the current block is the transform skip block.

The basic scale factor may have a specific scale factor value, and the specific scale factor value may be 16.

The basic scale factor may have a different scale factor value depending on whether or not the current block uses a quantization matrix.

The basic scale factor may have a different scale factor value depending on whether the current block is a luma block or a chroma block.

A flag indicating whether or not a transform skip algorithm is used in a picture including the current block is signaled through a Picture Parameter Set (PPS).

The basic scale factor may include information about a scale factor for a luma signal and a chroma signal.

In deriving the scale factor for the current block, a basic scale factor may be derived irrespective of the location of the transform coefficient within the current block if the current block is the transform skip block or the current block does not use a quantization matrix.

In deriving the scale factor for the current block, the scale factor for the current block may be derived using a quantization matrix based on the location of the transform coefficient within the current block if the current block is not a transform skip block.

In accordance with further yet another aspect of the present invention, there is provided an image encoding apparatus. The image encoding apparatus include a quantization unit for deriving a scale factor for a current block depending on whether or not the current block is a transform skip block and performing scaling on the current block based on the scale factor.

The scale factor for the current block may be derived based on a location of a transform coefficient within the current block, and the transform skip block may be a block in which transform has not been applied to the current block and is specified based on information indicative of whether or not to apply inverse transform to the current block.

Advantageous Effects

A block to which a transform skip algorithm has been applied has a different transform coefficient characteristic from an existing block on which a transform/inverse transform process has been performed because the transform/inverse transform process is not performed on the block to which the transform skip algorithm has been applied. That is, if a scaling method applied to an existing block on which the transform/inverse transform process has been performed is applied to a transform skip block, encoding/decoding efficiency can be reduced. Accordingly, encoding and decoding efficiency can be improved by likewise applying a scale factor to a transform skip block irrespective of the location of a transform coefficient within a block.

MODE FOR INVENTION

Figure 1:
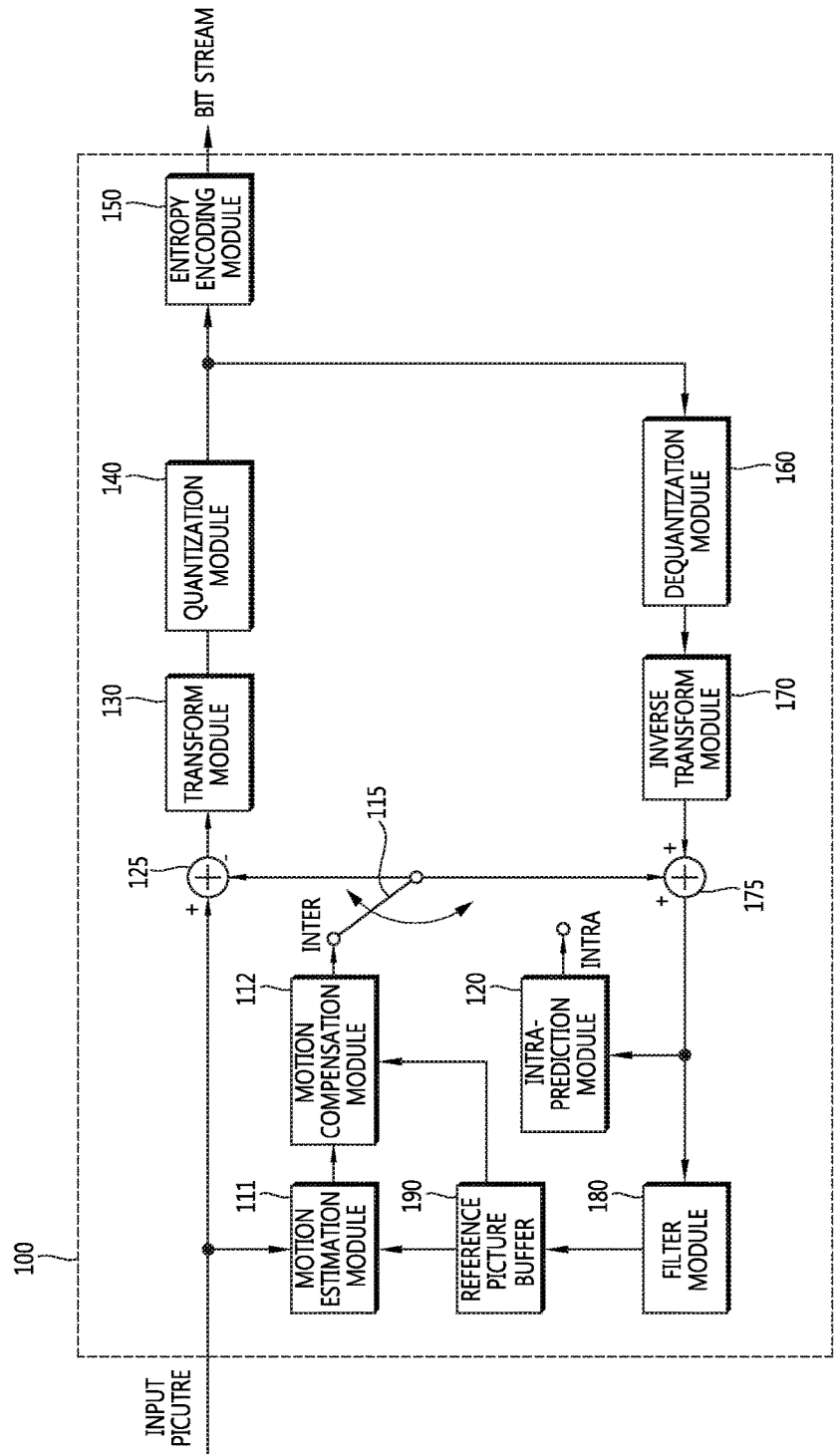
FIG. 1 is a block diagram showing the construction of an image encoding apparatus to which an embodiment of the present invention is applied.

Some exemplary embodiments of the present invention are described in detail with reference to the accompanying drawings. Furthermore, in describing the embodiments of this specification, a detailed description of the known functions and constitutions will be omitted if it is deemed to make the gist of the present invention unnecessarily vague.

In this specification, when it is said that one element is connected or coupled with the other element, it may mean that the one element may be directly connected or coupled with the other element or a third element may be connected or coupled between the two elements. Furthermore, in this specification, when it is said that a specific element is included, it may mean that elements other than the specific element are not excluded and that additional elements may be included in the embodiments of the present invention or the scope of the technical spirit of the present invention.

Terms, such as the first and the second, may be used to describe various elements, but the elements are not restricted by the terms. The terms are used to only distinguish one element from the other element. For example, a first element may be named a second element without departing from the scope of the present invention. Likewise, a second element may be named a first element.

Furthermore, element units described in the embodiments of the present invention are independently shown to indicate difference and characteristic functions, and it does not mean that each of the element units is formed of a piece of separate hardware or a piece of software. That is, the element units are arranged and included, for convenience of description, and at least two of the element units may form one element unit or one element may be divided into a plurality of element units and the plurality of divided element units may perform functions. An embodiment into which the elements are integrated or embodiments from which some elements are separated are also included in the scope of the present invention, unless they depart from the essence of the present invention.

Furthermore, in the present invention, some elements are not essential elements for performing essential functions, but may be optional elements for improving only performance. The present invention may be implemented using only essential elements for implementing the essence of the present invention other than elements used to improve only performance, and a structure including only essential elements other than optional elements used to improve only performance is included in the scope of the present invention.

First, in order to improve convenience of description and help understanding of the present invention, terms used in this specification are described in brief.

A unit means an image encoding or decoding unit. In other words, when an image is encoded or decoded, an encoding or decoding unit refers to a divided unit of one image when the image is sub-divided and encoded or decoded. The unit may also be called a block, a Macro Block (MB), a Coding Unit (CU), a Prediction Unit (PU), a Transform Unit (TU), a Coding Block (CB), a Prediction Block (PB), or a Transform Block (TB). One unit can be divided into smaller sub-units.

A block refers to an M×N array of samples. M and N have positive integer values. A block may commonly mean an array of a 2-D form.

A Transform Unit (TU) is a basic unit when encoding/decoding are performed on a residual signal, such as transform, inverse transform, quantization, dequantization, and the encoding/decoding of transform coefficients. One TU can be partitioned into a plurality of smaller TUs. Here, if the residual signal is present in a block form, the residual signal can be called a residual block.

A quantization matrix means a matrix used in a quantization or dequantization process in order to improve the subjective or objective picture quality of an image. The quantization matrix is also called a scaling list.

A quantization matrix can be divided into a default matrix, a non-default matrix, and a flat matrix. The default matrix can mean a specific quantization matrix predetermined in an encoder and a decoder. The non-default matrix may not be predetermined in an encoder and a decoder, but may mean a quantization matrix transmitted or received by a user. The flat matrix may mean a matrix in which all elements have the same value.

Scaling refers to a process of multiplying a transform coefficient level by a factor. As a result of the process, a transform coefficient is generated. Scaling is also called dequantization.

A transform coefficient refers to a coefficient value generated after transform is performed. In this specification, a quantized transform coefficient level obtained by applying quantization to a transform coefficient is also called a transform coefficient.

A quantization parameter refers to a value used to scale a transform coefficient level in quantization and dequantization. Here, the quantization parameter may be a value mapped to a quantization step size.

A parameter set corresponds to information about a header in a structure within a bit stream. The parameter set has a meaning that commonly designates a sequence parameter set, a picture parameter set, and an adaptation parameter set.

FIG. 1 is a block diagram showing the construction of an image encoding apparatus to which an embodiment of the present invention is applied.

Referring to FIG. 1, the image encoding apparatus 100 includes a motion estimation module 111, a motion compensation module 112, an intra-prediction module 120, a switch 115, a subtractor 125, a transform module 130, a quantization module 140, an entropy encoding module 150, a dequantization module 160, an inverse transform module 170, an adder 175, a filter module 180, and a reference picture buffer 190.

The image encoding apparatus 100 can perform encoding on an input image in intra-mode or inter-mode and output a bit stream. In the case of intra-mode, the switch 115 can switch to intra mode. In the case of inter-mode, the switch 115 can switch to inter-mode. Intra-prediction means intra-frame prediction, and inter-prediction means inter-frame. The image encoding apparatus 100 can generate a prediction block for the input block of the input image and then encode a difference between the input block and the prediction block. Here, the input image can mean the original picture.

In the case of intra-mode, the intra-prediction module 120 can generate the prediction block by performing spatial prediction using a value of the pixel of an already encoded block neighboring a current block.

In the case of inter-mode, the motion estimation module 111 can obtain a motion vector by searching a reference picture, stored in the reference picture buffer 190, for a region that is most well matched with the input block in a motion prediction process. The motion compensation module 112 can generate the prediction block by performing motion compensation using the motion vector and the reference picture stored in the reference picture buffer 190. Here, the motion vector is a two-dimensional (2-D) vector used in inter-prediction, and the motion vector can indicate an offset between a picture to be now encoded/decoded and a reference picture.

The subtractor 125 can generate a residual block based on the difference between the input block and the generated prediction block.

The transform module 130 can perform transform on the residual block and output a transform coefficient according to the transformed block. Furthermore, the quantization module 140 can output a quantized coefficient by quantizing the received transform coefficient according to a quantization parameter.

The entropy encoding module 150 can perform entropy encoding on a symbol according to a probability distribution based on values calculated by the quantization module 140, an encoding parameter value calculated in an encoding process, etc. and output a bit stream according to the entropy-coded symbols. If entropy encoding is applied, the size of a bit stream for a symbol to be encoded can be reduced because the symbol is represented by allocating a small number of bits to a symbol having a high incidence and a large number of bits to a symbol having a low incidence. Accordingly, the compression performance of image encoding can be improved through entropy encoding. The entropy encoding module 150 can use such encoding methods as exponential Golomb, Context-Adaptive Binary Arithmetic Coding (CABAC), and Context-Adaptive Binary Arithmetic Coding (CABAC) for the entropy encoding.

The image encoding apparatus 100 according to the embodiment of FIG. 1 performs inter-prediction encoding, that is, inter-frame prediction encoding, and thus a picture that has been coded needs to be decoded and stored in order to be used as a reference picture. Accordingly, a quantized coefficient is dequantization by the dequantization module 160 and inverse transformed by the inverse transform module 170. The dequantized and inversely transformed coefficient is added to the prediction block through the adder 175, thereby generating a reconstructed block. The reconstructed block experiences the filter module 180. The filter module 180 can apply one or more of a deblocking filter, a Sample Adaptive Offset (SAO), and an Adaptive Loop Filter (ALF) to the reconstructed block or the reconstructed picture. The filter module 180 may also be called an adaptive in-loop filter. The deblocking filter can remove block distortion generated at the boundary of blocks. The SAO can add a proper offset value to a pixel value in order to compensate for a coding error. The ALF can perform filtering based on a value obtained by comparing a reconstructed picture with the original picture. The reconstructed block that has experienced the filter module 180 can be stored in the reference picture buffer 190.

Figure 2:
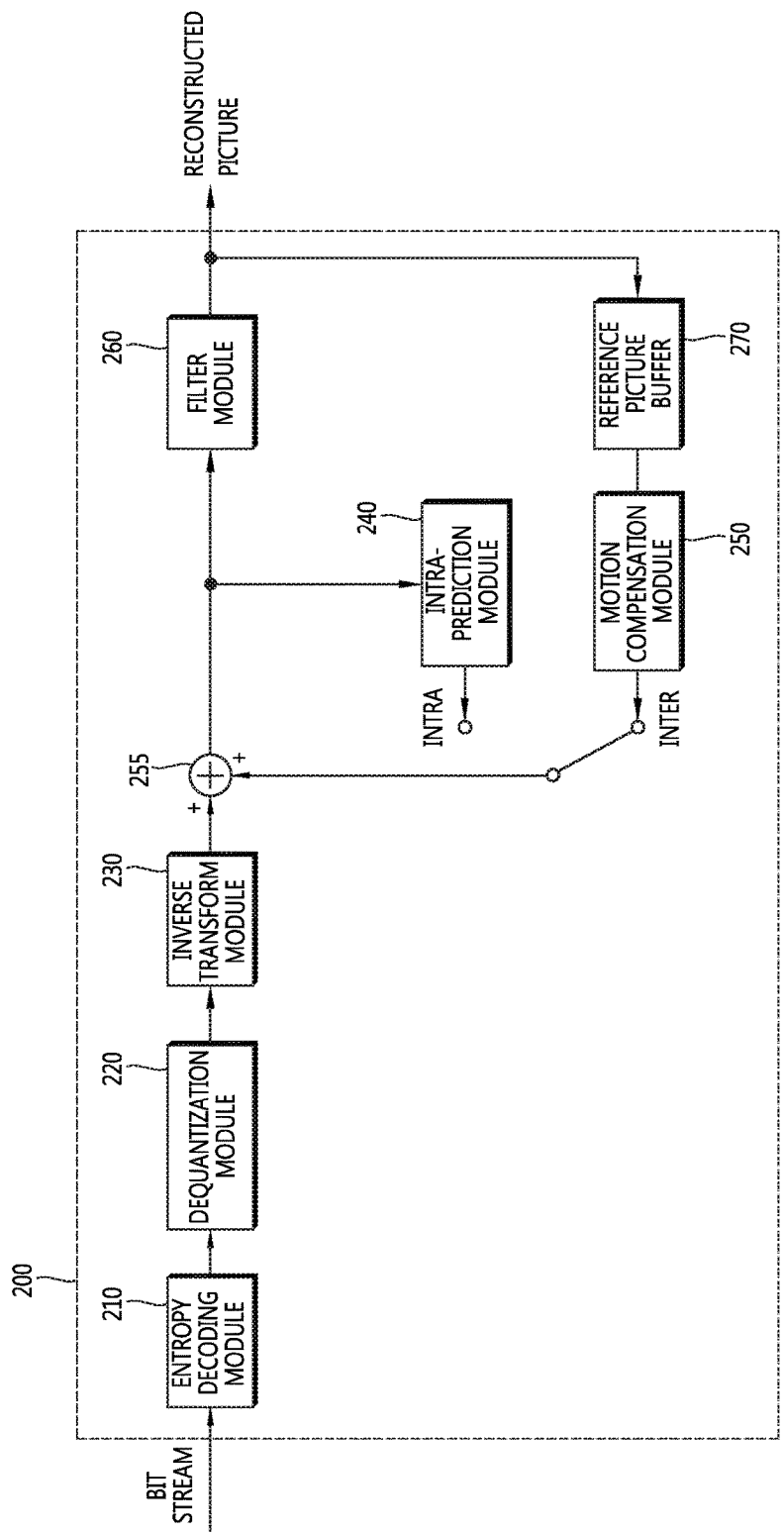
FIG. 2 is a block diagram showing the construction of an image decoding apparatus to which an embodiment of the present invention is applied.

FIG. 2 is a block diagram showing the construction of an image decoding apparatus to which an embodiment of the present invention is applied.

Referring to FIG. 2, the image decoding apparatus 200 includes an entropy decoding module 210, a dequantization module 220, an inverse transform module 230, an intra-prediction module 240, a motion compensation module 250, a filter module 260, and a reference picture buffer 270.

The image decoding apparatus 200 can receive a bit stream outputted from an encoder, perform decoding on the bit stream in intra-mode or inter-mode, and output a reconstructed image, that is, a reconstructed image. In the case of intra-mode, a switch can switch to intra-mode. In the case of inter-mode, the switch can switch to inter-mode.

The image decoding apparatus 200 can obtain a reconstructed residual block from the received bit stream, generate a prediction block, and generate a reconstructed block, that is, a restoration block, by adding the reconstructed residual block to the prediction block.

The entropy decoding module 210 can generate symbols including a symbol having a quantized coefficient form by performing entropy decoding on the received bit stream according to a probability distribution.

If an entropy decoding method is applied, the size of a bit stream for each symbol can be reduced because the symbol is represented by allocating a small number of bits to a symbol having a high incidence and a large number of bits to a symbol having a low incidence.

The quantized coefficient is dequantized by the dequantization module 220 and is inversely transformed by the inverse transform module 230. As a result of the dequantization/inverse transform of the quantized coefficient, a reconstructed residual block can be generated.

In the case of intra-mode, the intra-prediction module 240 can generate the prediction block by performing spatial prediction using a value of the pixel of an already encoded block neighboring a current block. In the case of inter-mode, the motion compensation module 250 can generate the prediction block by performing motion compensation using a motion vector and a reference picture stored in the reference picture buffer 270.

The residual block and the prediction block are added together by an adder 255. The added block experiences the filter module 260. The filter module 260 can apply at least one of a deblocking filter, an SAO, and an ALF to the reconstructed block or the reconstructed picture. The filter module 260 outputs a reconstructed image, that is, a reconstructed image. The reconstructed image can be stored in the reference picture buffer 270 and can be used for inter-frame prediction.

Figure 3:
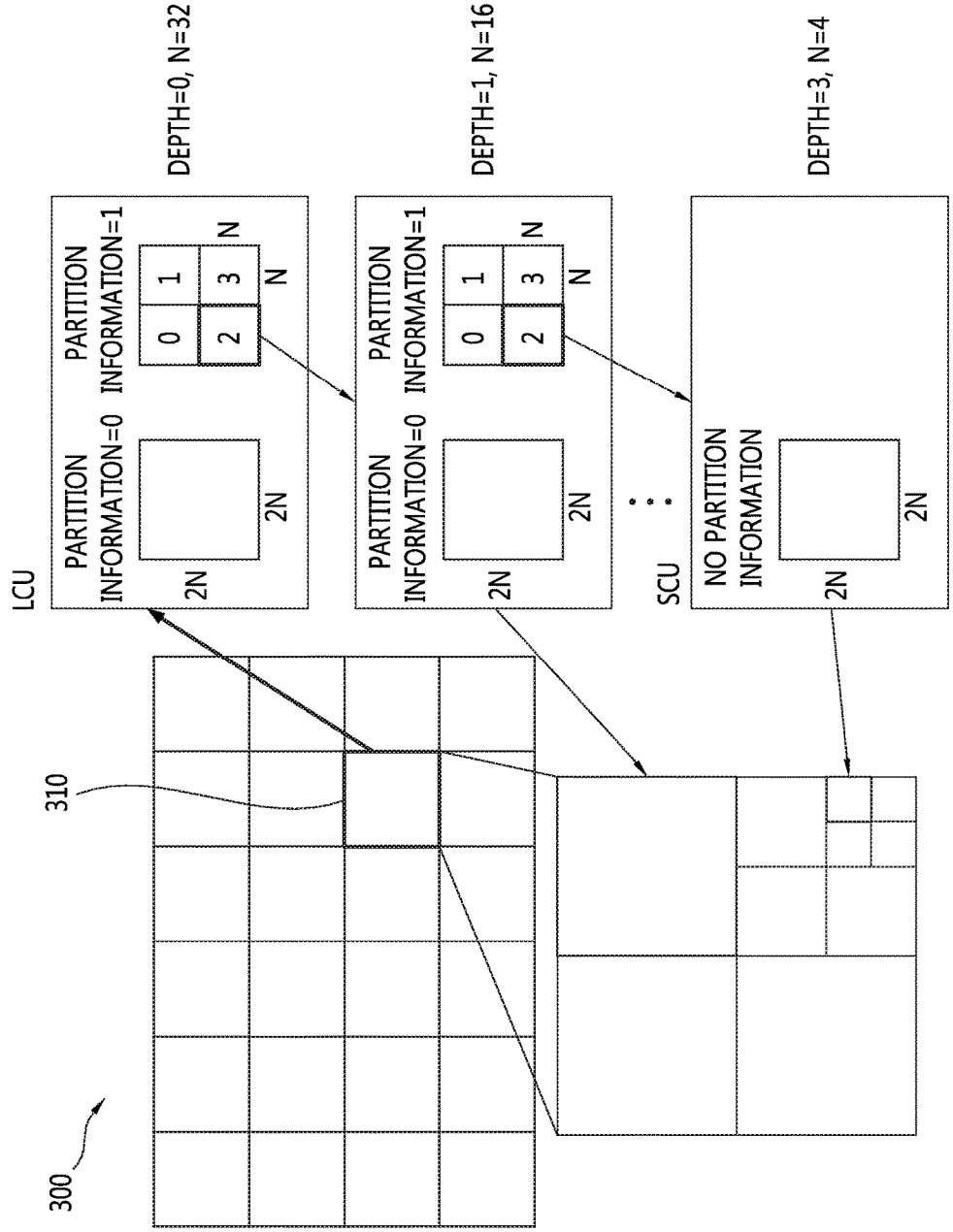
FIG. 3 is a diagram schematically showing the partition structure of an image when encoding the image.

FIG. 3 is a diagram schematically showing the partition structure of an image when encoding the image.

In High Efficiency Video Coding (HEVC), encoding is performed in a coding unit in order to efficiency partition an image.

Referring to FIG. 3, in HEVC, an image 300 is sequentially partitioned in the Largest Coding Unit (hereinafter referred to as an LCU), and a partition structure is determined based on the LCUs. The partition structure means a distribution of Coding Units (hereinafter referred to as CUs) for efficiently encoding an image within the LCU 310. This distribution can be determined based on whether or not one CU will be partitioned into four CUs each reduced by half from the one CU in a width size and a height size. Likewise, the partitioned CU can be recursively partitioned into four CUs each reduced by half from the partitioned CU in a width size and a height size.

Here, the partition of a CU can be recursively performed up to a predetermined depth. Information about the depth is information indicative of the size of a CU, and information about the depth of each CU is stored. For example, the depth of an LCU can be 0, and the depth of the Smallest Coding Unit (SCU) can be a predetermined maximum depth. Here, the LCU is a CU having a maximum CU size as described above, and the SCU is a CU having a minimum CU size.

Whenever partition is performed from the LCU 310 by half in a width size and a height size, the depth of a CU is increased by 1. A CU on which partitions has not been performed has a 2N×2N size for each depth, and a CU on which partition is performed is partitioned from a CU having a 2N×2N size to four CUs each having an N×N size. The size of N is reduced by half whenever the depth is increased by 1.

Referring to FIG. 3, the size of the LCU having a minimum depth of 0 can be 64×64 pixels, and the size of the SCU having a maximum depth of 3 can be 8×8 pixels. Here, the LCU having 64×64 pixels can be represented by a depth of 0, a CU having 32×32 pixels can be represented by a depth of 1, a CU having 16×16 pixels can be represented by a depth of 2, and the SCU having 8×8 pixels can be represented by a depth of 3.

Furthermore, information about whether or not a specific CU will be partitioned can be represented through partition information of 1 bit for each CU. The partition information can be included in all CUs other than the SCU. For example, if a CU is not partitioned, partition information of 0 can be stored. If a CU is partitioned, partition information of 1 can be stored.

Meanwhile, a CU partitioned from the LCU can include a Prediction Unit (PU) (or Prediction Block (PB)), that is, a basic unit for prediction, and a Transform Unit (TU) (or Transform Block (TB)), that is, a basic unit for transform.

Figure 4:
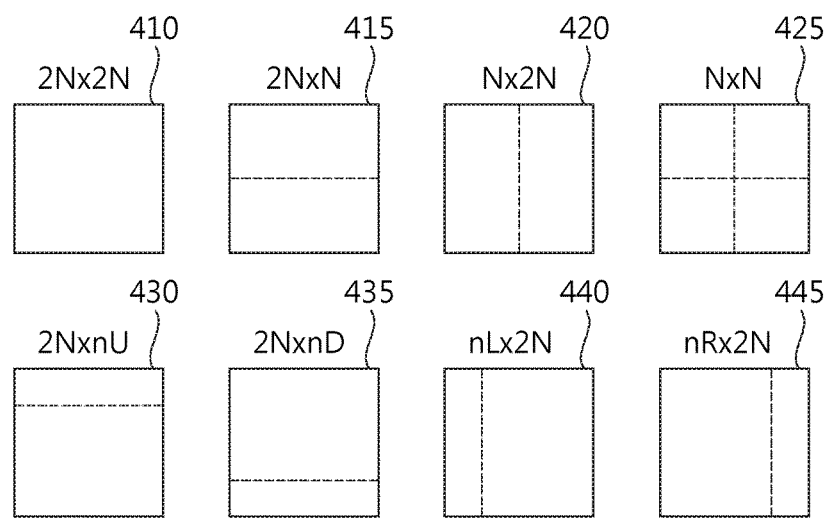
FIG. 4 is a diagram showing the forms of a PU that may be included in a CU.

FIG. 4 is a diagram showing the forms of a PU that may be included in a CU.

A CU that is no longer partitioned, from among CUs partitioned from the LCU, is partitioned into one or more PUs. This behavior itself is also call partition. A Prediction Unit (hereinafter referred to as a PU) is a basic unit on which prediction is performed and encoded in any one of skip mode, inter-mode, and intra mode. The PU can be partitioned in various forms depending on each mode.

Referring to FIG. 4, in the case of skip mode, a 2N×2N mode 410 having the same size as a CU can be supported without partition within the CU.

In the case of inter-mode, 8 partitioned forms, for example, the 2N×2N mode 410, a 2N×N mode 415, an N×2N mode 420, an N×N mode 425, a 2N×nU mode 430, a 2N×nD mode 435, an nL×2N mode 440, and an nR×2N mode 445 can be supported within a CU.

In the case of intra-mode, the 2N×2N mode 410 and the N×N mode 425 can be supported within a CU.

Figure 5:
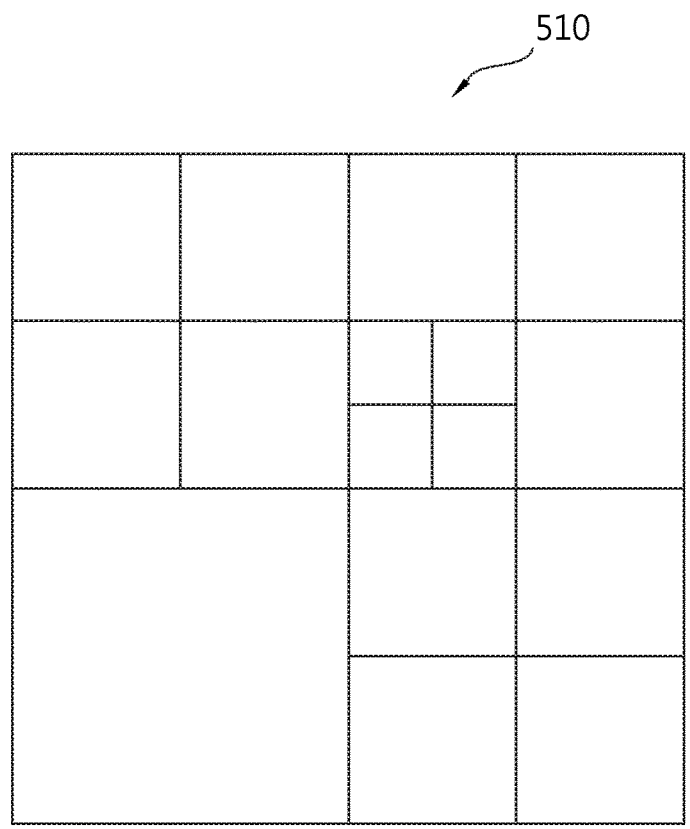
FIG. 5 is a diagram showing the forms of a TU that may be included in a CU.

FIG. 5 is a diagram showing the forms of a TU that may be included in a CU.

A Transform Unit (hereinafter referred to as a TU) is a basic unit used for spatial transform and a quantization/dequantization (scaling) process within a CU. A TU can have a rectangular or square form. A CU that is no longer partitioned, from among CUs partitioned from the LCU, can be partitioned into one or more TUs.

Here, the partition structure of the TU can be a quad-tree structure. For example, as shown in FIG. 5, one CU 510 can be partitioned once or more depending on a quad-tree structure, thus form TUs having various sizes.

Meanwhile, in HEVC, as in H.264/AVC, inter-frame prediction (hereinafter referred to as intra-prediction) encoding can be performed. Here, encoding can be performed by deriving intra-prediction mode (or prediction directivity) for a current block from neighboring blocks located near the current block.

As described above, a prediction image for a signal obtained by performing prediction based on intra-prediction mode can have a difference value from the original image. A residual image having the difference value between the prediction image and the original image can be subject to entropy encoding after experiencing frequency region transform and quantization. Here, in order to increase encoding efficiency of the frequency region transform, integer transform, Discrete Cosine Transform (DCT), Discrete Sine Transform (DST), or DCT/DST dependent on intra-prediction mode can be applied selectively and adaptively depending on the size of a block.

Furthermore, in order to increase encoding efficiency in screen contents, such as a document image or a presentation image in PowerPoint, a transform skip algorithm can be used.

If the transform skip algorithm is used, an encoder directly quantizes a residual image (or residual block) having a difference value between the original image and a prediction image without a frequency transform process and performs entropy encoding on the residual block. Furthermore, a decoder performs entropy decoding on the residual block and generates a reconstructed residual block by performing dequantization (scaling) on the entropy-decoded block. Accordingly, a block on which the transform skip algorithm has been applied skips a frequency transform/inverse transform process.

In a quantization/dequantization process, a scale factor can be differently applied depending on the location of a transform coefficient within a block in order to improve the subject picture quality of an image. In contrast, there is a method of equally applying a scale factor irrespective of the location of a transform coefficient within a block when performing quantization/dequantization. Whether or not to apply this method can be signaled through the Sequence Parameter Set (SPS) or Picture Parameter Set (PPS) of a bit stream.

As an embodiment of the process, a scaling process for transform coefficient can be performed as follows.

Scaling Process for Transform Coefficients
In this case, input is as follows.
The width of a current transform block; nW
The height of the current transform block; nH
An array of transform coefficients having an element $c_{ij}$; (nW×nH) array d
An index for the luma signal and the chroma signal of the current block; cIdx
If cIdx is 0, it means a luma signal. If cIdx is 1 or cIdx is 2, it means a chroma signal. Furthermore, if cIdx is 1, it means Cb in a chroma signal. I cIdx is 2, it means Cr in a chroma signal.
A quantization parameter; qP
In this case, output is as follows.
An array of scaled transform coefficients; (nW×nH) array $d_{ij}$
A parameter 'log 2TrSize' is derived through log 2TrSize=(Log 2 (nW)+Log 2 (nH))>>1. A parameter shift is differently derived depending on cIdx. If cIx is 0 (in the case of a luma signal), the parameter shift is derived from 'shift=BitDepth$_Y$+log 2TrSize−5'. If not (in the case of a chroma signal), the parameter shift is derived from 'shift=BitDepth$_C$+log 2TrSize−5'. Here, BitDepth$_Y$ and BitDepth$_C$ mean the number of bits (e.g., 8 bits) of a sample for a current image.

An array 'levelScale[ ]' for scaling parameters is the same as Equation 1 below.

levelScale[k]={40,45,51,57,64,72} with k=0 . . . 5    [Equation 1]

A scaled transform coefficient is calculated through the following process.

First, a scale factor $m_{ij}$ is derived through the following process.

If scaling_list_enable_flag is 0, the scale factor $m_{ij}$ is derived as in Equation 2 below.

$m_{ij}$=16    [Equation 2]

If not, the scale factor $m_{ij}$ is derived as in Equation 3 below.

$m_{ij}$=ScalingFactor[SizeID][RefMatrixID][trafoType][i*nW+j]    [Equation 3]

In Equation 3, SizeID is derived through Table 1 below according to the size of a transform block, and RefMatrixID and trafoType are derived from Equation 4 and Equation 5 below, respectively. Furthermore, in Equation 4, scaling_list_pred_matrix_id_delta is signaled through the Sequence Parameter Set (SPS) or a Picture Parameter Set (PPS) of a bit stream.

RefMatrixID=MatrixID−scaling_list_pred_matrix_id_delta    [Equation 4]

trafoType=((nW==nH)?0:((nW>nH)?1:2))    [Equation 5]

Table 1 is an example showing a SizeID value according to the size of a transform block.

TABLE 1

| Size of quantization matrix | SizeID |
|---|---|
| 4 × 4 | 0 |
| 8 × 8 (16 × 4, 4 × 16) | 1 |
| 16 × 16 (32 × 8, 8 × 32) | 2 |
| 32 × 32 | 3 |

Next, a scaled transform coefficient $d_{ij}$ is derived from Equation 6 below.

$d_{ij}$=Clip3(−32768,32767,(($c_{ij}$*$m_{ij}$*levelScale[qP %6]<<(qP/6))+(1<<(shift−1)))>>shift)    [Equation 6]

Meanwhile, a frequency transform process is not performed on a block to which the transform skip algorithm has been applied as described above (hereinafter referred to as a transform skip block). Accordingly, an existing block on which the frequency transform process has been performed and a transform skip block can have different transform coefficient characteristics. That is, if a scaling method applied to an existing block on which the frequency transform process has been performed is applied to a transform skip block without change, encoding efficiency can be reduced.

Accordingly, the present invention provides a method of performing scaling by taking a case where a block is a transform skip block into consideration.

If a quantization matrix (default matrix and non-default matrix) is used in an encoder and a decoder in order to improve the subjective picture quality of an image, a scale factor derived from the quantization matrix can be differently applied depending on the location of a transform coefficient within a block. In this method, quantization having a greater quantization step size is performed on a high frequency region that is less sensitive to an eye of a person rather than a low frequency region that is sensitive to an eye of a person by using a characteristic in which the energy of a residual block is compressed into the left top (i.e., low frequency region) of the block when transforming the block. In accordance with this method, subjective picture quality for a region sensitive to an eye of a person can be improved when encoding an image.

If the transform skip algorithm is applied, however, a residual block is not compressed toward a low frequency region within the residual block because frequency region transform/inverse transform is not performed on the residual block. In this case, if a quantization/dequantization method used in an existing frequency region is applied, there is a disadvantage in that distortion within an image or block becomes severe. Accordingly, if a quantization matrix is used within an image, there is a need for a scaling (quantization/dequantization) method capable of reducing distortion within an image or block in a block on which frequency region transform/inverse transform is not performed (i.e., transform skip block). For example, there is a method of not applying a quantization matrix to a transform skip block. In this method, a basic scale factor can be equally applied irrespective of the location of a transform coefficient within a block.

Figure 6:
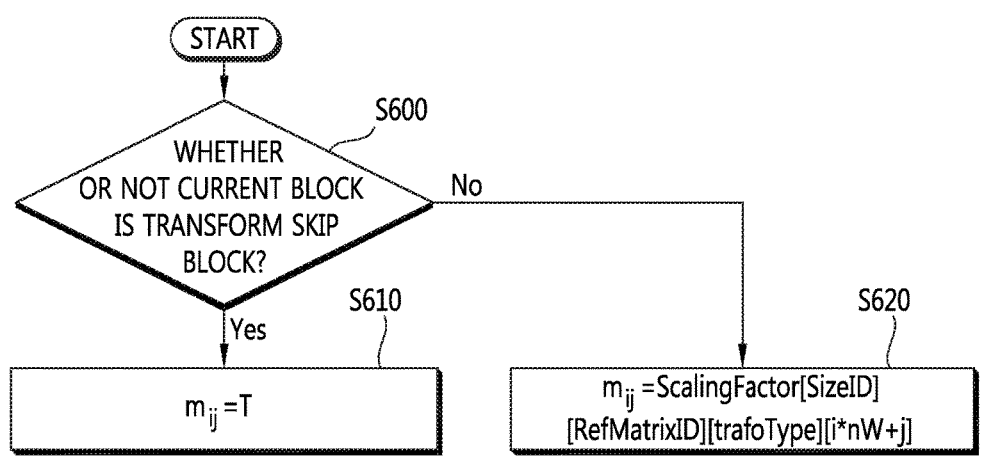
FIG. 6 is a flowchart illustrating a scaling method for a residual signal (or transform coefficient) in accordance with an embodiment of the present invention.

[Embodiment 1] A Method and Apparatus for Equally Applying a Scale Factor to a Transform Skip Block Irrespective of the Location of a Transform Coefficient within the Block FIG. 6 is a flowchart illustrating a scaling method for a residual signal (or transform coefficient) in accordance with an embodiment of the present invention.

The scaling method of FIG. 6 can be performed in the encoding apparatus of FIG. 1 or the decoding apparatus of FIG. 2. More particularly, the scaling method of FIG. 6 can be performed in the quantization unit or the dequantization unit of FIG. 1 or 2. In the embodiment of FIG. 6, the scaling method of FIG. 6 is illustrated as being performed in the encoding apparatus for convenience of description, but the scaling method of FIG. 6 can be equally applied in the decoding apparatus.

Referring to FIG. 6, a scale factor $m_{ij}$ applied when performing scaling (quantization or dequantization) on a residual signal (or transform coefficient) within a current block can be derived depending on whether or not the current block is a transform skip block.

The encoding apparatus determines whether or not a current block is a transform skip block at step S600.

Whether or not the current block is a transform skip block can be determined based on information indicating whether or not the current block is a transform skip block. For example, the information indicating whether or not the current block is a transform skip block can be a flag 'transSkipFlag'. A value of the flag 'transSkipFlag' can be derived by performing entropy decoding on information about a transform skip block within a bit stream. If the current block is a transform skip block, a value of the flag 'transSkipFlag' can be 1. If the current block is not a transform skip block, a value of the flag 'transSkipFlag' can be 0.

If, as a result of the determination, it is determined that the current block is a transform skip block (e.g., a value of the flag 'transSkipFlag' is 1), the encoding apparatus derives a scale factor $m_{ij}$ irrespective of the location of a residual signal (or transform coefficient) within the current block at step S610.

Here, as shown in FIG. 6, the scale factor $m_{ij}$ can be set to a specific basic scale factor value T. For example, the specific basic scale factor value T can be 16.

If, as a result of the determination, it is determined that the current block is not a transform skip block (e.g., a value of the flag 'transSkipFlag' is 0), the encoding apparatus derives a scale factor $m_{ij}$) based on the location of a residual signal (or transform coefficient) within the current block at step S620.

Here, the scale factor $m_{ij}$ can be differently set depending on the residual signal (or transform coefficient) within the current block using the quantization matrix. The scale factor $m_{ij}$ can be derived as in Equation 7 below, as shown in FIG. 6.

$$m_{ij}=\text{ScalingFactor}[\text{SizeID}][\text{RefMatrixID}][\text{trafoType}][i*nW+j] \quad \text{[Equation 7]}$$

In Equation 7, ScalingFactor is an array in which scale factors are stored. SizeID can be a value indicating the size of the current block (transform block or quantization matrix), and a value of SizeID can be derived depending on the size of the current block (transform block) as in Table 1 above. RefMatrixID and trafoType can be derived from Equation 8 and Equation 9 below, respectively. nW is the width of the current block.

$$\text{RefMatrixID}=\text{MatrixID}-\text{scaling\_list\_pred\_matrix\_id\_delta} \quad \text{[Equation 8]}$$

In Equation 8, a value of MatrixID can mean the type of quantization matrix according to prediction mode and a color component. For example, a value of MatrixID can be derived as in Table 2 below. scaling_list_pred_matrix_id_delta is signaled through the Sequence Parameter Set (SPS) or Picture Parameter Set (PPS) of a bit stream.

$$\text{trafoType}=((nW==nH)?0:((nW>nH)?1:2)) \quad \text{[Equation 9]}$$

In Equation 9, nW means the width of the current block, and nH means the height of the current block.

Table 2 shows MatrixID values according to prediction mode and color components.

TABLE 2

| SizeID | CuPredMode | cIdx (colour component) | matrixId |
|---|---|---|---|
| 0, 1, 2 | MODE_INTRA | 0(Y) | 0 |
| 0, 1, 2 | MODE_INTRA | 1(Cb) | 1 |
| 0, 1, 2 | MODE_INTRA | 2(Cr) | 2 |
| 0, 1, 2 | MODE_INTER | 0(Y) | 3 |
| 0, 1, 2 | MODE_INTER | 1(Cb) | 4 |
| 0, 1, 2 | MODE_INTER | 2(Cr) | 5 |
| 3 | MODE_INTRA | 0(Y) | 0 |
| 3 | MODE_INTER | 0(Y) | 1 |

Figure 7:
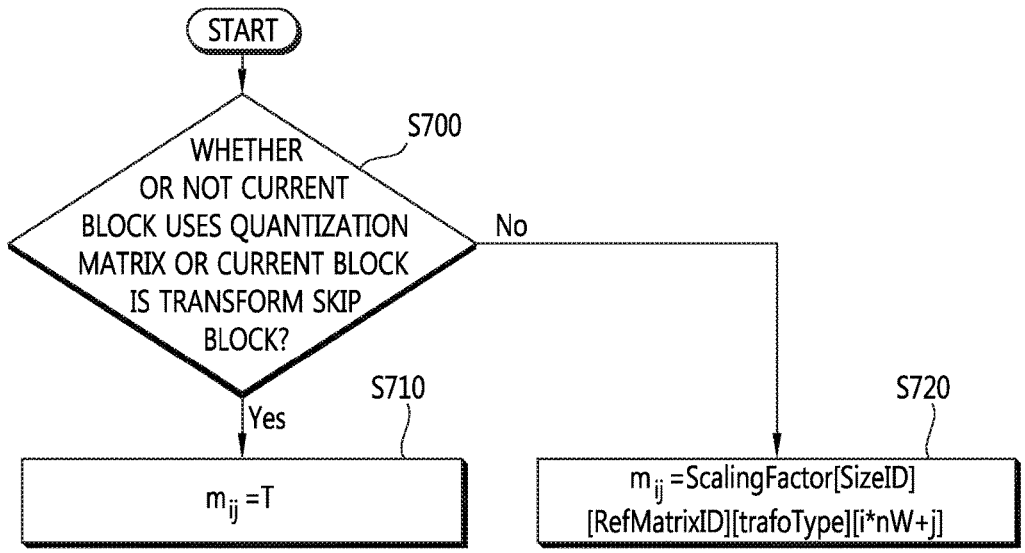
FIG. 7 is a flowchart illustrating a scaling method for a residual signal (or transform coefficient) in accordance with another embodiment of the present invention.

FIG. 7 is a flowchart illustrating a scaling method for a residual signal (or transform coefficient) in accordance with another embodiment of the present invention.

The scaling method of FIG. 7 can be performed in the encoding apparatus of FIG. 1 or the decoding apparatus of FIG. 2. More particularly, the scaling method of FIG. 7 can be performed in the quantization unit or the dequantization unit of FIG. 1 or 2. In the embodiment of FIG. 7, the scaling method of FIG. 7 is illustrated as being performed in the encoding apparatus for convenience of description, but the scaling method of FIG. 7 can be equally applied in the decoding apparatus.

Referring to FIG. 7, a scale factor $m_{ij}$ applied when performing scaling (quantization or dequantization) on the residual signal (or transform coefficient) of a current block can be derived depending on whether or not the current block is a transform skip block and whether or not a quantization matrix is used.

The encoding apparatus determines whether or not a current block uses a quantization matrix and whether or not the current block is a transform skip block at step S700.

Whether or not the current block uses a quantization matrix can be determined based on information indicating whether or not the current block uses a quantization matrix. For example, the information indicating whether or not the current block uses a quantization matrix can be a flag 'scaling_list_enable_flag'. A value of the flag 'scaling_list_enable_flag' can be derived by performing entropy decoding on information about the use of a quantization matrix within a bit stream. If the current block uses a quantization matrix, a value of the flag 'scaling_list_enable_flag' can be 1. If the current block does not use a quantization matrix, a value of the flag 'scaling_list_enable_flag' can be 0.

Furthermore, whether or not the current block is a transform skip block can be determined based on information indicating whether or not the current block is a transform skip block. For example, the information indicating whether or not the current block is a transform skip block can be a flag 'transSkipFlag'. A value of the flag 'transSkipFlag' can be derived by performing entropy decoding on information about a transform skip block within a bit stream. If the current block is a transform skip block, a value of the flag 'transSkipFlag' can be 1. If the current block is not a transform skip block, a value of the flag 'transSkipFlag' can be 0.

If, as a result of the determination, it is determined that the current block is a transform skip block or the current block does not use a quantization matrix (e.g., transSkipFlag==1 or scaling_list_enable_flag==0), the encoding apparatus derives a scale factor $m_{ij}$ irrespective of the location of a residual signal (or transform coefficient) within a current block at step S710.

As shown in FIG. 7, the scale factor $m_{ij}$ can be set to a specific basic scale factor value T. For example, the specific basic scale factor value T can be 16.

If, as a result of the determination, it is determined that the current block is not a transform skip block and the current block uses a quantization matrix, the encoding apparatus derives a scale factor $m_{ij}$ based on the location of a residual signal (or transform coefficient) within the current block at step S720.

The scale factor $m_{ij}$ can be differently set depending on the location of the residual signal (or transform coefficient) within the current block using the quantization matrix and can be derived as in an equation shown at step S720 of FIG. 7. The scale factor $m_{ij}$ derived by the equation shown at step S720 has been described with reference to step S620 of FIG. 6, and a description thereof is omitted.

As described above with reference to FIGS. 6 and 7, if a current block (i.e., a target block to be encoded or decoded now) is a transform skip block, a scale factor having the specific value T has been applied to the current block (i.e., transform skip block) irrespective of the location of a coefficient (or signal) within the current block. Here, a value of the scale factor according to an embodiment of the present invention may be differently set depending on various encoding parameters applied to a corresponding block.

For example, a value of the scale factor to be applied to a corresponding block can be set as follows depending on a value of a parameter (e.g., scaling_list_enable_flag) indicating whether or not a quantization matrix is used.

If a quantization matrix is used (e.g., scaling_list_enable_flag==1), a basic scale factor value is set to 'T1' ($m_{ij}$=T1)

If a quantization matrix is not used (e.g., scaling_list_enable_flag==0), a basic scale factor value is set to 'T2' ($m_{ij}$=T2)

The T1 and/or T2 values may be determined and signaled by an encoder, or predetermined T1 and/or T2 values may be used. If the T1 and/or T2 values are signaled through a bit stream, a decoder can obtain the T1 and/or T2 values by parsing the bit stream.

For another example, a value of the scale factor to be applied to a corresponding block can be set as follows based on a value of information (e.g., color component index cIdx) on which a color characteristic for the signal of the corresponding block can be derived. The color component index cIdx indicates a luma signal (i.e., Y signal) or a chroma signal (i.e., Cb signal or Cr signal) depending on its value.

Example 1: a basic scale factor value is set to 'Ty' or 'Tc' depending on whether or not the signal of a corresponding block is a luma signal. For example, if the signal of the corresponding block is a luma signal, the basic scale factor value is set to 'Ty'. If the signal of the corresponding block is not a luma signal (i.e., chroma signal), the basic scale factor value is set to 'Tc'.

Example 2: a basic scale factor value is set according to each color component of a corresponding block. For example, if the color component of the corresponding block is a luma signal (i.e., Y signal), the basic scale factor value is set to 'Ty'. If a chroma signal is a Cb signal, the basic scale factor value is set to 'Tcb'. If the chroma signal is a Cr signal, the basic scale factor value is set to 'Tcr'.

Here, the Ty, Tc, Tcb and/or Tcr values may be determined and signaled by an encoder, or predetermined Ty, Tc, Tcb and/or Tcr values may be used. If the Ty, Tc, Tcb and/or Tcr values are signaled through a bit stream, a decoder can obtain the Ty, Tc, Tcb and/or Tcr values by parsing the bit stream.

The methods of determining the basic scale factor depending on the encoding parameters according to the embodiments of the present invention may be applied independently or in combination, but the same scale factor value needs to be always applied to the same transform skip block irrespective of the location of a coefficient (or signal) within the block (i.e., target block to be encoded or decoded).

A scaling process for transform coefficients into which the embodiments of the present invention have been incorporated can be performed as follows.

Scaling Process for Transform Coefficients

In this case, input is as follows.

The width of a current transform block; nW

The height of the current transform block; nH

An array of transform coefficients having an element $c_{ij}$; (nW×nH) array d

Information indicating whether or not the transform skip algorithm has been applied to the current transform block An index for the luma signal and the chroma signal of the current transform block; cIdx If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

A quantization parameter; qP

In this case, output is as follows.

An array of scaled transform coefficients; (nW×nH) array $d_{ij}$

A parameter 'log 2TrSize' is derived through log 2TrSize=(Log 2 (nW)+Log 2 (nH))>>1'. A parameter shift is differently derived according to cIdx. If cIx is 0 (i.e., in the case of a luma signal), the parameter shift is derived from 'shift=BitDepth$_Y$+log 2TrSize−5'. If not (i.e., in the case of a chroma signal), the parameter shift is derived from 'shift=BitDepth$_C$+log 2TrSize−5'. Here, BitDepth$_Y$ and BitDepth$_C$ mean the number of bits (e.g., 8 bits) of a sample for a current image.

An array 'levelScale[ ]' of scaling parameters is the same as Equation 10.

$$\text{levelScale}[k]=\{40,45,51,57,64,72\} \text{ with } k=0 \ldots 5 \quad \text{[Equation 10]}$$

A scaled transform coefficient is calculated through the following process.

First, a scale factor $m_{ij}$ is derived through the following process.

If scaling_list_enable_flag is 0 or the current transform block is a transform skip block, the scale factor $m_{ij}$ is derived as in Equation 11 below.

$$m_{ij}=16 \quad \text{[Equation 11]}$$

If not, the scale factor $m_{ij}$ is derived as in Equation 12 below.

$$m_{ij}=\text{ScalingFactor[SizeID][RefMatrixID][trafoType]}[i^*nW+j] \quad \text{[Equation 12]}$$

In Equation 12, SizeID is derived through Table 1 above according to the size of a transform block, and RefMatrixID and trafoType are derived from Equation 13 and Equation 14 below, respectively. Furthermore, in Equation 13, scaling_list_pred_matrix_id_delta is signaled through the Sequence Parameter Set (SPS) of a bit stream.

$$\text{RefMatrixID=MatrixID−scaling\_list\_pred\_matrix\_id\_delta} \quad \text{[Equation 13]}$$

$$\text{trafoType}=((nW==nH)?0:((nW>nH)?1:2)) \quad \text{[Equation 14]}$$

Next, a scaled transform coefficient $d_{ij}$ is derived from Equation 15 below.

$$d_{ij}=\text{Clip3}(-32768,32767,((c_{ij}*m_{ij}*\text{levelScale}[qP\%6])<<(qP/6))+(1<<(\text{shift}-1)))>>\text{shift}) \quad \text{[Equation 15]}$$

Here, $d_{ij}$ is an array of the scaled transform coefficients, and $r_{ij}$ means an array for a residual block obtained by performing inverse transform on the scaled transform coefficients.

As an embodiment into which the inverse transform process of the scaled transform coefficient has been incorporated, a transform process for the scaled transform coefficients can be performed as follows.

Transform Process for Scaled Transform Coefficients

In this case, input is as follows.

The width of a current transform block; nW

The height of the current transform block; nH

An array of transform coefficients having an element $d_{ij}$; (nW×nH) array d

Information indicating whether or not the transform skip algorithm has been applied to the current transform block An index for the luma signal and the chroma signal of the current transform block; cIdx If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

A quantization parameter; qP

In this case, output is as follows.

An array for a residual block obtained by performing inverse transform on the scaled transform coefficients; (nW×nH) array r If encoding mode 'PredMode' for a current block is intra-prediction mode, a value of Log 2(nW*nH) is 4, and a value of cIdx is 0, parameters 'horizTrType' and 'vertTrType' are obtained through Table 3 below depending on intra-prediction mode of a luma signal. If not, the parameters 'horizTrType' and 'vertTrType' are set to 0.

Table 3 shows an example of values of the parameters 'horizTrType' and 'vertTrType' according to intra-prediction mode.

TABLE 3

| | IntraPredMode | | | | | | | | | | | | | | | | | |
|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 |
| vertTrType | 1 | 0 | 0 | 0 | 0 | 0 | 0 | 0 | 0 | 0 | 0 | 1 | 1 | 1 | 1 | 1 | 1 | 1 |
| horizTrType | 1 | 0 | 1 | 1 | 1 | 1 | 1 | 1 | 1 | 1 | 1 | 1 | 1 | 1 | 1 | 1 | 1 | 1 |

| | IntraPredMode | | | | | | | | | | | | | | | | |
|---|---|---|---|---|---|---|---|---|---|---|---|---|---|---|---|---|---|
| | 18 | 19 | 20 | 21 | 22 | 23 | 24 | 25 | 26 | 27 | 28 | 29 | 30 | 31 | 32 | 33 | 34 |
| vertTrType | 1 | 1 | 1 | 1 | 1 | 1 | 1 | 1 | 1 | 1 | 1 | 1 | 1 | 1 | 1 | 1 | 1 |
| horizTrType | 1 | 1 | 1 | 1 | 1 | 1 | 1 | 1 | 0 | 0 | 0 | 0 | 0 | 0 | 0 | 0 | 0 |

Meanwhile, an inverse transform process is performed on the transform coefficient scaled through the scaling process as described above. Here, the inverse transform process is not performed, but only the following shift operation process is performed on the current transform block to which the transform skip algorithm has been applied.

1. If cIdx of a current block is 0 (in the case of a luma signal) shift=13−BitDepth$_Y$. If not (in the case of a chroma signal), shift=13−BitDepth$_C$.

2. An array $r_{ij}$ (i=0 . . . (nW)−1, j=0 . . . (nH)−1) for a residual block is set as follows.

If a shift is greater than 0, $r_{ij}=(d_{ij}+(1<<(\text{shift}-1)))>>\text{shift}$. If not, $r_{ij}=(d_{ij}<<(-\text{shift}))$.

A residual signal for the current block is obtained according to the following sequence.

First, if the transform skip algorithm for the current block has been applied, the following process is performed.

1. If cIdx is 0, shift=13−BitDepth$_Y$. If not, shift=13−BitDepth$_C$.

2. An array $r_{ij}$ (i=0 . . . (nW)−1, j=0 . . . (nH)−1) for the residual block is set as follows.

If the shift is greater than 0, $r_{ij}=(d_{ij}+(1<<(\text{shift}-1)))>>\text{shift}$. If not, $r_{ij}=(d_{ij}<<(-\text{shift}))$.

If the transform skip algorithm for the current block has not been applied, the following process is performed.

1. An inverse transform process is performed on scaled transform coefficients using values of the parameters 'horizTrType' and 'vertTrType'. First, the size (nW, nH) of the current block, an array '(nW×nH) array d' for the scaled transform coefficients, and the parameter 'horizTrType' are received, and an array '(nW×nH) array e' is outputted by performing 1-dimensional inverse transform horizontally.

2. Next, the array '(nW×nH) array e' is received, and the array '(nW×nH) array g' is derived as in Equation 16.

$$g_{ij}=\text{Clip3}(-32768,32767,(e_{ij}+64)>7) \quad \text{[Equation 16]}$$

3. Next, the size (nW, nH) of the current block, the array 'nW×nH array g', and the parameter 'vertTrType' are received, and 1-dimensional inverse transform is performed horizontally.

4. Next, an array '(nW×nH) array r' for the residual block is set as in Equation 17 below depending on cIdx.

$$r_{ij}=(f_{ij}+(1<<(\text{shift}-1)))>>\text{shift} \quad \text{[Equation 17]}$$

In Equation 17, the shift=20−BitDepth$_Y$ when cIdx is 0. If not, the shift=20−BitDepth$_C$. BitDepth means the number of bits (e.g., 8 bits) of a sample for the current image.

A reconstructed residual block can be generated by performing the above-described scaling process on transform coefficients and the above-described transform process on the scaled transform coefficients. Furthermore, a reconstructed block can be generated by adding a prediction block, generated through intra-prediction or inter-prediction, to the reconstructed residual block. Here, the reconstructed block may be a block to which a loop filter has been applied or a block to which a loop filter has not been applied.

Hereinafter, the present invention provides a method of signaling a basic scale factor derived depending on whether or not a current block is a transform skip block.

In accordance with an embodiment of the present invention, the basic scale factor derived depending on whether or not a current block is a transform skip block can be signaled through a Sequence Parameter Set (SPS).

Table 4 shows an example of an SPS syntax for signaling information about a basic scale factor in accordance with an embodiment of the present invention.

TABLE 4

| | Descriptor |
|---|---|
| seq_parameter_set_rbsp( ) { | |
| ....... | |
| transform_skip_enabled_flag | u(1) |
| if( transform_skip_enabled_flag ) { | |
|     flat_scale_factor_y_minus16 | se(v) |
|     flat_scale_factor_cb_minus16 | se(v) |
|     flat_scale_factor_cr_minus16 | se(v) |
| } | |
| ....... | |
| } | |

Referring to Table 4, transform_skip_enabled_flag indicates whether or not the transform skip algorithm will be used in a current sequence.

If the transform skip algorithm is used in the current sequence, flat_scale_factor_y_minus16, flat_scale_factor_cb_minus16, and flat_scale_factor_cr_minus16 are signaled. Each of the values can be encoded (se(v)) in a form having a positive or negative sign. Or, each of the values can be encoded (ue(v)) in a form having 0 and a positive sign.

flat_scale_factor_y_minus16 means a scale factor for a luma signal. For example, if a value of flat_scale_factor_y_minus16 is 0, the scale factor for the luma signal has a value of 16 in which 16 has been added to 0.

flat_scale_factor_cb_minus16 means a scale factor for a chroma signal Cb. flat_scale_factor_cr_minus16 means a scale factor for a chroma signal Cr.

The scale factor for the luma signal or the chroma signal can be derived as in Equation 18 to 20.

Here, the basic scale factor FlatScalingFactor[cIdx] stores a scale factor for a luma signal and a chroma signal. For example, if a color component index cIdx is 0, the basic scale factor can indicate a luma (Y) signal. If the color component index cIdx is 1, the basic scale factor can indicate a Cb chroma signal. If the color component index cIdx is 2, the basic scale factor can indicate a Cr chroma signal. Furthermore, a value of the basic scale factor 'FlatScalingFactor[cIdx]' can have a range of specific values. For example, an 8-bit signal can have a value from −15 to '255-16'.

A basic scale factor for a luma signal can be derived as in Equation 18.

$$\text{FlatScalingFactor}[0]=16+(\text{transform\_skip\_enabled\_flag}==1)?:\text{flat\_scale\_factor}\_y\_\text{minus16:0} \quad \text{[Equation 18]}$$

A basic scale factor for a Cb chroma signal can be derived as in Equation 19.

$$\text{FlatScalingFactor}[\mathbf{1}]=16+(\text{transform\_skip\_enabled\_flag}==1)?:\text{flat\_scale\_factor}\_cb\_\text{minus16:0} \quad \text{[Equation 19]}$$

A basic scale factor for a Cr chroma signal can be derived as in Equation 20.

$$\text{FlatScalingFactor}[2]=16+(\text{transform\_skip\_enabled\_flag}==1)?:\text{flat\_scale\_factor}\_cr\_\text{minus16:0} \quad \text{[Equation 20]}$$

A scaling process for transform coefficients can be performed as follows by incorporating the method of signaling a basic scale factor derived depending on whether or not a current block is a transform skip block in accordance with the embodiment of the present invention into the scaling process.

Scaling Process for Transform Coefficients

In this case, input is as follows.

The width of a current transform block; nW

The height of the current transform block; nH

An array of transform coefficients having an element $c_{ij}$; (nW×nH) array d

Information indicating whether or not the transform skip algorithm has been applied to the current transform block; transSkipFlag If a value of transSkipFlag is 1, it indicates that the transform skip algorithm has been applied to the current block. If a value of transSkipFlag is 0, it indicates that the transform skip algorithm has not been applied to the current block.

An index for the luma signal and the chroma signal of the current block; cIdx

If cIdx is 0, it means a luma signal. If cIdx is 1 or cIdx is 2, it means a chroma signal. Furthermore, if cIdx is 1, it means Cb in a chroma signal. If cIdx is 2, it means Cr in a chroma signal.

A quantization parameter; qP

In this case, output is as follows.

An array of scaled transform coefficients; (nW×nH) array $d_{ij}$

A parameter log 2TrSize is derived through log 2TrSize= (Log 2 (nW)+Log 2 (nH))>>1. A parameter shift is differently derived depending on cIdx. If cIx is 0 (in the case of a luma signal), the parameter shift is derived from 'shift=BitDepth$_Y$+log 2TrSize−5'. If not (i.e., in the case of a chroma signal), the parameter shift is derived from 'shift=BitDepth$_C$+log 2TrSize−5'. Here, BitDepth$_Y$ and BitDepth$_C$ mean the number of bits (e.g., 8 bits) of a sample for a current image.

An array 'levelScale[ ]' for the scaling parameters is the same as Equation 21.

$$\text{levelScale}[k]=\{40,45,51,57,64,72\} \text{ with } k=0\ldots 5 \quad \text{[Equation 21]}$$

A scaled transform coefficient is calculated through the following process.

First, a scale factor $m_{ij}$ is derived through the following process.

If scaling_list_enable_flag is 0, the scale factor $m_{ij}$ is derived as in Equation 22 below.

$$m_{ij}=(\text{transSkipFlag}==1)?\text{FlatScaleFactor}[\text{cIdx}]:16 \quad \text{[Equation 22]}$$

If not (i.e., if scaling_list_enable_flag is 1), the scale factor $m_{ij}$ is derived as in Equation 23 below.

$$m_{ij}=(\text{transSkipFlag}==1)?\text{FlatScaleFactor}[\text{cIdx}]:\text{ScalingFactor}[\text{SizeID}][\text{ReMatrixID}][\text{trafoType}][i*nW+j] \quad \text{[Equation 23]}$$

In Equation 23, SizeID is derived through Table 1 above depending on the size of a block. RefMatrixID and trafoType are derived from Equation 24 and Equation 25 below, respectively. In Equation 24, scaling_list_pred_matrix_id_delta is signaled through the Sequence Parameter Set (SPS) of a bit stream.

$$\text{RefMatrixID}=\text{MatrixID}-\text{scaling\_list\_pred\_matrix\_id\_delta} \quad \text{[Equation 24]}$$

$$\text{trafoType}=((nW==nH)?0:((nW>nH)?1:2)) \quad \text{[Equation 25]}$$

Next, a scaled transform coefficient dij is derived from Equation 26 below.

$$d_{ij}=\text{Clip3}(-32768,32767,((c_{ij}*m_{ij}*\text{levelScale}[qP\%6]<<(qP/6))+(1<<(\text{shift}-1)))>>\text{shift}) \quad \text{[Equation 26]}$$

Meanwhile, a basic scale factor derived depending on whether or not a current block is a transform skip block according to an embodiment of the present invention can be signaled through a Picture Parameter Set (PPS) or a slice header 'SliceHeader' in addition to the above-described SPS. Furthermore, the basic scale factor may be signaled in a CU unit or a TU unit.

Values flat_scale_factor_y_minus16, flat_scale_factor_cb_minus16, and flat_scale_factor_cr_minus16 signaled through the above-described SPS can be updated in a PPS (or SliceHeader, CU, or TU) and used.

Table 5 shows an example of a PPS syntax for signaling information about the basic scale factor in accordance with another embodiment of the present invention.

Referring to Table 5, transform_skip_enabled_flag indicates whether or not the transform skip algorithm will be used in a current picture. If the transform skip algorithm is used, a value of pps_flat_scaling_factor_present_flag is signaled.

For example, if a value of pps_flat_scaling_factor_present_flag is 0, flat_scale_factor_y_minus16, flat_scale_factor_cb_minus16, and flat_scale_factor_cr_minus16 applied to the above-described SPS are used as scale factors for a transform skip block. If a value of pps_flat_scaling_factor_present_flag is 1, corresponding values are signaled in order to update values of flat_scale_factor_y_minus16, flat_scale_factor_cb_minus16, and flat_scale_factor_cr_minus16 applied in the above-described SPS.

The signaled values 'flat_scale_factor_y_minus16, flat_scale_factor_cb_minus16, and flat_scale_factor_cr_minus16' are used as scale factors for the transform skip block of a current picture. Here, the values continue to be used until they are not changed again. Or, the values may be applied to only a current picture, and scale factor values used in an SPS may be applied to a next picture.

Here, each of the values 'flat_scale_factor_y_minus16, flat_scale_factor_cb_minus16, and flat_scale_factor_cr_minus16' can be encoded (se(v)) in a form having a positive or negative sign. Or, each of the values can be encoded (ue(v)) in a form having 0 and a positive sign.

The values 'flat_scale_factor_y_minus16, flat_scale_factor_cb_minus16, and flat_scale_factor_cr_minus16' can be signaled with different values according to each luma signal and each chroma signal. For example, the value 'flat_scale_factor_y_minus16' can be used to signal a scale factor for a luma signal, the value 'flat_scale_factor_cb_minus16' can be used to signal a scale factor for a Cb chroma signal, and the value 'flat_scale_factor_cr_minus16' can be used to signal a scale factor for a Cr chroma signal. Or, a scale factor for a luma signal may be signaled using flat_scale_factor_y_minus16, and a scale factor for a chroma signal may be signaled using flat_scale_factor_cb_cr_minus16. Or, a scale factor for a luma signal and a chroma signal may be signaled using one value 'flat_scale_factor_y_cb_cr_minus16'.

As described above, the values 'flat_scale_factor_y_minus16, flat_scale_factor_cb_minus16, and flat_scale_factor_cr_minus16' signaled in the SPS or PPS can be updated in SliceHeader (or CU or TU) and used.

Table 6 shows an example of a slice header 'SliceHeader' syntax for signaling information about a basic scale factor in accordance with yet another embodiment of the present invention.

TABLE 5

| | Descriptor |
|---|---|
| pic_parameter_set_rbsp( ) { | |
| ...... | |
|    transform_skip_enabled_flag | u(1) |
|    if( transform_skip_enabled_flag ) { | |
|      pps_flat_scaling_factor_present_flag | u(1) |
|      if( pps_flat_scaling_factor_present_flag ) { | |
|         flat_scale_factor_y_minus16 | se(v) |
|         flat_scale_factor_cb_minus16 | se(v) |
|         flat_scale_factor_cr_minus16 | se(v) |
|      } | |
|    } | |
| ...... | |
| } | |

TABLE 6

| | Descriptor |
|---|---|
| slice_header( ) { | |
| ...... | |
|    if( transform_skip_enabled_flag ) { | |
|      flat_scaling_factor_override_flag | u(1) |
|      if( flat_scaling_factor_override_flag ) { | |
|         flat_scale_factor_y_delta | se(v) |
|         flat_scale_factor_cb_delta | se(v) |
|         flat_scale_factor_cr_delta | se(v) |
|      } | |
|    } | |
| ...... | |
| } | |

Referring to Table 6, transform_skip_enabled_flag indicates whether or not the transform skip algorithm will be used in a current slice. If the transform skip algorithm will be used, a value of flat_scaling_factor_override_flag is signaled.

For example, if a value of flat_scaling_factor_override_flag is 0, flat_scale_factor_y_minus16, flat_scale_factor_cb_minus16, and flat_scale_factor_cr_minus16 applied in the above-described SPS or PPS are used as scale factors for a transform skip block. If a value of flat_scaling_factor_override_flag is 1, corresponding values are signaled in order to update values of flat_scale_factor_y_minus16, flat_scale_factor_cb_minus16, and flat_scale_factor_cr_minus16 applied in the above-described SPS or PPS.

The values 'flat_scale_factor_y_delta, flat_scale_factor_cb_delta, and flat_scale_factor_cr_delta' are used as scale factors for the transform skip block of the current slice.

Here, each of the values 'flat_scale_factor_y_delta, flat_scale_factor_cb_delta, and flat_scale_factor_cr_delta' can be encoded (se(v)) in a form having a positive or negative sign. Or, each of the values can be encoded (ue(v)) in a form having 0 and a positive sign.

Each of 'flat_scale_factor_y_delta, flat_scale_factor_cb_delta, and flat_scale_factor_cr_delta' can be signaled with a different value according to each luma signal and each chroma signal. For example, a value of flat_scale_factor_y_delta can be used to signal a scale factor for a luma signal, a value of flat_scale_factor_cb_delta can be used to signal a scale factor for a Cb chroma signal, and a value of flat_scale_factor_cr_delta can be used to signal a scale factor for a Cr chroma signal. Or, a scale factor for a luma signal may be signaled using flat_scale_factor_y_delta, and a scale factor for a chroma signal may be signaled using flat_scale_factor_cb_cr_delta. Or, scale factors for a luma signal and a chroma signal may be signaled using one value of flat_scale_factor_y_cb_cr_delta.

A basic scale factor can be derived as in Equations 27 to 29 below using the values 'flat_scale_factor_y_delta, flat_scale_factor_cb_delta, and flat_scale_factor_cr_delta' signaled as described above.

Here, the basic scale factor 'FlatScalingFactor[cIdx]' stores a scale factor for a luma signal and a chroma signal. For example, if the color component index cIdx is 0, the basic scale factor can indicate a luma (Y) signal. If the color component index cIdx is 1, the basic scale factor can indicate a Cb chroma signal. If the color component index cIdx is 2, the basic scale factor can indicate a Cr chroma signal. Furthermore, a value of the basic scale factor 'FlatScalingFactor[cIdx]' can indicate a range of specific values. For example, an 8-bit signal can have a range from −15 to '255-16'.

A basic scale factor for a luma signal can be derived as in Equation 27 using flat_scale_factor_y_delta.

FlatScalingFactor[0]=16+(transform_skip_enabled_flag==1)?:(flat_scale_factor_y_minus16+flat_scale_factor_y_delta):0    [Equation 27]

A basic scale factor for a Cb chroma signal can be derived as in Equation 28 using flat_scale_factor_cb_delta.

FlatScalingFactor[1]=16+(transform_skip_enabled_flag==1)?:(flat_scale_factor_cb_minus16+flat_scale_factor_cb_delta):0    [Equation 28]

A basic scale factor for a Cr chroma signal can be derived as in Equation 29 using flat_scale_factor_cr_delta.

FlatScalingFactor[2]=16+(transform_skip_enabled_flag==1)?:(flat_scale_factor_cr_minus16+flat_scale_factor_cr_delta):0    [Equation 29]

Meanwhile, the above-described embodiments can have a different range of application depending on the size of a block, the depth of a CU, or the depth of a TU. A parameter (e.g., information about the size or depth of a block) that determines the range of application may be set by an encoder and a decoder so that the parameter has a predetermined value or may be set to have a predetermined value according to a profile or level. When an encoder writes a parameter value into a bit stream, a decoder may obtain the value from the bit stream and use the value.

If the range of application is different depending on the depth of a CU, the following three methods can be applied to the above-described embodiments as illustrated in Table 7. The method A is applied to only a depth having a specific depth or higher, the method B is applied to only a depth having a specific depth or lower, and the method C is applied to only a specific depth.

Table 7 shows an example of methods of determining a range in which the methods of the present invention are applied depending on the depth of a CU (or TU). In Table 7, a mark 'O' means that a corresponding method is applied to a corresponding depth of a CU (or TU), and a mark 'X' means that a corresponding method is not applied to a corresponding depth of a CU (or TU).

TABLE 7

| Depth of CU (or TU) indicating a range of application | Method A | Method B | Method C |
|---|---|---|---|
| 0 | X | O | X |
| 1 | X | O | X |
| 2 | O | O | O |
| 3 | O | X | X |
| 4 or higher | O | X | X |

Referring to Table 7, if the depth of a CU (or TU) is 2, all the method A, the method B, and the method C can be applied to the embodiments of the present invention.

If the embodiments of the present invention are not applied to all depths of a CU (or TU), it may be indicated using a specific indicator (e.g., flag) or may be represented by signaling a value one greater than a maximum value of the depth of a CU using a value of the depth of a CU indicative of a range of application.

Furthermore, the method of determining the range in which the methods of the present invention are applied depending on the above-described depth of a CU (or TU) can be differently applied depending on the sizes of a luma block and a chroma block and can be differently applied depending on a luma image and a chroma image.

Table 8 shows an example schematically showing a combination of methods of determining a range of application depending on the sizes of a luma block and a chroma block.

TABLE 8

| LUMA BLOCK SIZE | CHROMA BLOCK SIZE | LUMA APPLIED | CHROMA APPLIED | METHODS |
|---|---|---|---|---|
| 4(4 × 4, 4 × 2, 2 × 4) | 2(2 × 2) | O or X | O or X | A 1, 2, . . . |
| | 4(4 × 4, 4 × 2, 2 × 4) | O or X | O or X | B 1, 2, . . . |
| | 8(8 × 8, 8 × 4, 4 × 8, 2 × 8, etc.) | O or X | O or X | C 1, 2, . . . |
| | 16(16 × 16, 16 × 8, 4 × 16, 2 × 16, etc.) | O or X | O or X | D 1, 2, . . . |
| | 32(32 × 32) | O or X | O or X | E 1, 2, . . . |

TABLE 8-continued

| LUMA BLOCK SIZE | CHROMA BLOCK SIZE | LUMA APPLIED | CHROMA APPLIED | METHODS |
|---|---|---|---|---|
| 8(8 × 8, 8 × 4, 2 × 8, etc.) | 2(2 × 2) | O or X | O or X | F 1, 2, . . . |
| | 4(4 × 4, 4 × 2, 2 × 4) | O or X | O or X | G 1, 2, . . . |
| | 8(8 × 8, 8 × 4, 4 × 8, 2 × 8, etc.) | O or X | O or X | H 1, 2, . . . |
| | 16(16 × 16, 16 × 8, 4 × 16, 2 × 16, etc.) | O or X | O or X | I 1, 2, . . . |
| | 32(32 × 32) | O or X | O or X | J 1, 2, . . . |
| 16(16 × 16, 8 × 16, 4 × 16, etc.) | 2(2 × 2) | O or X | O or X | K 1, 2, . . . |
| | 4(4 × 4, 4 × 2, 2 × 4) | O or X | O or X | L 1, 2, . . . |
| | 8(8 × 8, 8 × 4, 4 × 8, 2 × 8, etc.) | O or X | O or X | M 1, 2, . . . |
| | 16(16 × 16, 16 × 8, 4 × 16, 2 × 16, etc.) | O or X | O or X | N 1, 2, . . . |
| | 32(32 × 32) | O or X | O or X | O 1, 2, . . . |

In the case of the method "G 1" of the methods listed in Table 8, if the size of the luma block is 8(8×8, 8×4, 2×8, etc.) and the size of the chroma block is 4(4×4, 4×2, 2×4), the embodiment 1 (G 1—embodiment 1) of the present invention can be applied to a luma signal and a chroma signal and a horizontal signal and a vertical signal.

In the above-described embodiments, although the methods have been described based on the flowcharts in the form of a series of steps or blocks, the present invention is not limited to the sequence of the steps, and some of the steps may be performed in a different order from that of other steps or may be performed simultaneous to other steps. Furthermore, those skilled in the art will understand that the steps shown in the flowchart are not exclusive and the steps may include additional steps or that one or more steps in the flowchart may be deleted without affecting the scope of the present invention.

The above description is only an example of the technical spirit of the present invention, and those skilled in the art may change and modify the present invention in various ways without departing from the intrinsic characteristic of the present invention. Accordingly, the disclosed embodiments should not be construed as limiting the technical spirit of the present invention, but should be construed as illustrating the technical spirit of the present invention. The scope of the technical spirit of the present invention is not restricted by the embodiments, and the scope of the present invention should be interpreted based on the appended claims. Accordingly, the present invention should be construed as covering all modifications or variations induced from the meaning and scope of the appended claims and their equivalents.

What is claimed is:

1. An image decoding method with a decoding apparatus, comprising:
    deriving a scale factor for a current block depending on whether or not the current block is a transform skip block;
    performing scaling on transform coefficients of the current block based on the scale factor;
    obtaining residual samples of the current block by selectively performing an inverse-transform on the scaled transform coefficients;
    performing prediction for the current block to generate a prediction block; and
    reconstructing the current block by adding the residual samples and the prediction block,
    wherein, when the current block is not the transform skip block, the scale factor for the current block is derived based on a quantization matrix defined at the decoding apparatus and a location of a transform coefficient within the current block,
    wherein, when the current block is the transform skip block, the scale factor for the current block is derived equal to a fixed constant value, regardless of the location of the transform coefficient within the current block,
    wherein the transform skip block is specified based on information indicative of whether or not to apply inverse transform to the current block
    wherein the prediction is intra prediction.

2. The image decoding method of claim 1, wherein the fixed constant value is 16.

3. The image decoding method of claim 1, wherein the scale factor is derived depending on whether or not the current block uses the quantization matrix defined at the decoding apparatus.

4. The image decoding method of claim 1, wherein the scale factor is derived depending on whether the current block is a luma block or a chroma block.

5. The image decoding method of claim 1, wherein a flag indicating whether or not a transform skip algorithm is used in a picture comprising the current block is signaled through a Picture Parameter Set (PPS).

6. An image encoding method with an encoding apparatus, comprising:
    performing prediction for a current block to generate a prediction block;
    generating residual samples of the current block by subtracting the prediction block from the current block;
    obtaining transform coefficients by selectively performing a transform on the residual samples of the current block;
    determining a scale factor for the current block depending on whether or not the current block is a transform skip block; and
    performing quantization on the transform coefficients of the current block based on the scale factor,
    wherein, when the current block is not the transform skip block, the scale factor for the current block is determined based on a quantization matrix defined at the encoding apparatus and a location of a transform coefficient within the current block,
    wherein, when the current block is the transform skip block, the scale factor for the current block is determined equal to a fixed constant value, regardless of the location of the transform coefficient within the current block, and
    wherein indication of the transform skip block is encoded using information indicative of whether or not to apply inverse transform to the current block, and
    wherein the prediction is intra prediction.

7. The image encoding method of claim 6, wherein the fixed constant value is 16.

8. The image encoding method of claim 6, wherein the scale factor is determined depending on whether or not the current block uses the quantization matrix defined at the encoding apparatus.

9. The image encoding method of claim 6, wherein the scale factor is determined depending on whether the current block is a luma block or a chroma block.

10. The image encoding method of claim 6, wherein a flag indicating whether or not a transform skip algorithm is used in a picture comprising the current block is encoded into a Picture Parameter Set (PPS).

11. A non-transitory computer-readable recording medium storing a bitstream that is generated by an image encoding method with an encoding apparatus, wherein the image encoding method comprises
   performing prediction for a current block to generate a prediction block;
   generating residual samples of the current block by subtracting the prediction block from the current block;
   obtaining transform coefficients by selectively performing a transform on the residual samples of the current block;
   determining a scale factor for the current block depending on whether or not the current block is a transform skip block; and
   performing quantization on the transform coefficients of the current block based on the scale factor,
   wherein, when the current block is not the transform skip block, the scale factor for the current block is determined based on a quantization matrix defined at the encoding apparatus and a location of a transform coefficient within the current block,
   wherein, when the current block is the transform skip block, the scale factor for the current block is determined equal to a fixed constant value, regardless of the location of the transform coefficient within the current block, and
   wherein indication of the transform skip block is encoded using information indicative of whether or not to apply inverse transform to the current block, and
   wherein the prediction is intra prediction.

12. The non-transitory computer-readable recording medium of claim 11, wherein the fixed constant value is 16.

13. The non-transitory computer-readable recording medium of claim 11, wherein the scale factor is determined depending on whether or not the current block uses the quantization matrix defined at the encoding apparatus.

14. The non-transitory computer-readable recording medium of claim 11, wherein the scale factor is determined depending on whether the current block is a luma block or a chroma block.

15. The non-transitory computer-readable recording medium of claim 11, wherein a flag indicating whether or not a transform skip algorithm is used in a picture comprising the current block is encoded into a Picture Parameter Set (PPS).

* * * * *